(12) United States Patent
Triebel et al.

(10) Patent No.: US 8,515,921 B2
(45) Date of Patent: Aug. 20, 2013

(54) DATA RATIONALIZATION

(75) Inventors: William Triebel, San Francisco, CA (US); Roy Devine, Jersey City, NJ (US); Vijay Saxena, San Mateo, CA (US); Karen Jaffe, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 223 days.

(21) Appl. No.: 12/849,228

(22) Filed: Aug. 3, 2010

(65) Prior Publication Data

US 2012/0036170 A1 Feb. 9, 2012

(51) Int. Cl.
*G06F 17/30* (2006.01)

(52) U.S. Cl.
USPC .......................................... 707/692; 707/694

(58) Field of Classification Search
USPC .......................................... 707/688, 692, 694
See application file for complete search history.

(56) References Cited

U.S. PATENT DOCUMENTS

| | | | |
|---|---|---|---|
| 5,634,053 A | 5/1997 | Noble et al. | |
| 5,664,109 A | 9/1997 | Johnson et al. | |
| 5,845,255 A | 12/1998 | Mayaud | |
| 5,911,132 A | 6/1999 | Sloane | |
| 5,924,074 A | 7/1999 | Evans | |
| 6,076,088 A | 6/2000 | Paik et al. | |
| 6,128,620 A | 10/2000 | Pissanos et al. | |
| 6,219,674 B1 | 4/2001 | Classen | |
| 6,778,994 B2 | 8/2004 | Gogolak | |
| 7,865,358 B2 * | 1/2011 | Green et al. | 704/10 |
| 2002/0165853 A1 * | 11/2002 | Gogolak | 707/3 |
| 2005/0197547 A1 * | 9/2005 | Trinks et al. | 600/300 |
| 2009/0055378 A1 * | 2/2009 | Alecu et al. | 707/5 |
| 2009/0100017 A1 * | 4/2009 | Graves et al. | 707/3 |
| 2010/0145720 A1 * | 6/2010 | Reiner | 705/2 |

* cited by examiner

*Primary Examiner* — Khanh Pham
(74) *Attorney, Agent, or Firm* — Kraguljac Law Group LLC (57) ABSTRACT

Systems, methods, and other embodiments associated with data rationalization are described. One example method includes receiving data from a primary data repository and automatically rationalizing the data by applying rationalization rules that map one or more non-preferred data instances to a preferred data instance. Any non-preferred data instances that have not been automatically rationalized into a preferred data instance are provided to an interface for manual rationalization. Automatically and manually rationalized data is stored in a rationalized data repository. In addition, rationalization rules based on the manual rationalization are extracted for use in subsequent automatic rationalization operations.

17 Claims, 6 Drawing Sheets

DATA RATIONALIZATION

BACKGROUND

Many research endeavors leverage large data repositories storing raw experimental or product usage data. The data repositories often employ unique formats, making it necessary to manipulate the data from each repository to get the data in a standardized form. Often this manipulation is performed on a per repository basis in an ad hoc manner. In fields that involve some sort of regulatory agency, information regarding the various data sources that were used to derive results may be required by the agency.

In the field of pharmacovigilance (PV), in which adverse reactions to drugs (typically called adverse events (AEs)) are tracked, data is recorded in many formats and data coding standards by many data collection agencies. Thus, it is difficult for drug companies to leverage the vast amount of AE data that is available. Drug companies must often choose between ignoring AE data sources that are incompatible with their analysis systems or performing expensive custom rationalization of the reference data prior to importation of the AE data into their analysis systems.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
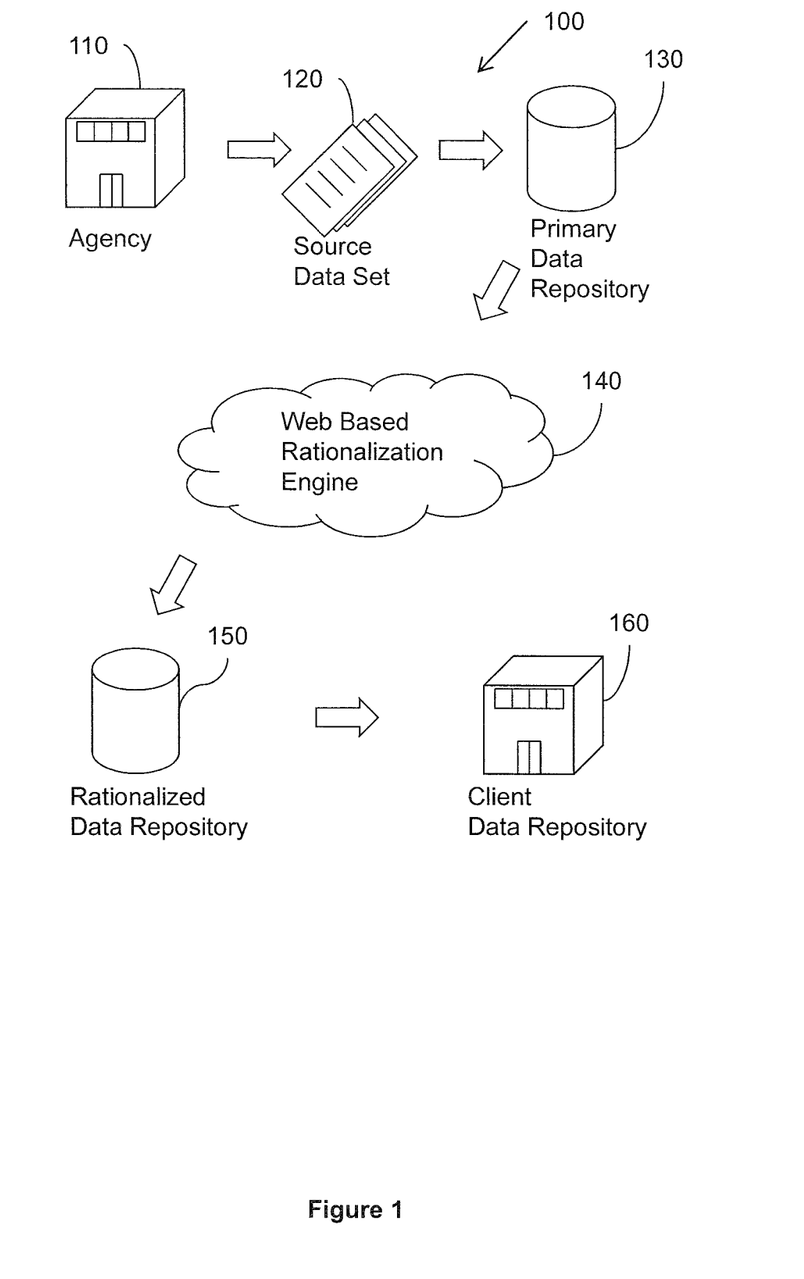
FIG. 1 illustrates a schematic overview of an example embodiment of a data rationalization process.

FIG. 1 illustrates an example embodiment of a rationalization system 100 that accesses raw adverse event (AE) data from one or more sources, such as a public health tracking agency 110. A source data set 120 is pulled from the agency 110. The source data 120 has a format that is determined by the agency and may be in E2B format or other agency specific format. The source data 120 is stored in a primary data repository 130. The source data 120 may be retained in the primary data repository without modification so that access to original data may be made after the data rationalization process. A web based rationalization engine 140 is provided that is configured to input data from the primary data repository 130 and output rationalized data in a rationalized data repository 150. The rationalized data is provided in a standardized format, such as XML to facilitate publication of the rationalized data to a client data repository 160. Thus the rationalization system 100 rationalizes and harmonizes existing AE data and prepares the rationalized data for transition into proprietary databases operated by corporate clients. The corporate client may then use the data for analysis, projections, comparisons, and other internal processes.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

E2B and E2B+ refer to international standards for the transmittal of electronic pharmaceutical safety data as specified by the International Conference on Harmonisation. Preparation of E2B and E2B+ compliant files involves mapping of the sender's database to an E2B data set. After the database is mapped to the E2B data set, the data is then marked in conformance with a specified XML specification.

XML refers to extensible markup language. XML is a document format, a meta-markup language for text documents. XML documents are often conceptualized as trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Logic", as used herein, includes but is not limited to hardware, firmware, instructions stored in a non-transitory computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

Figure 2:
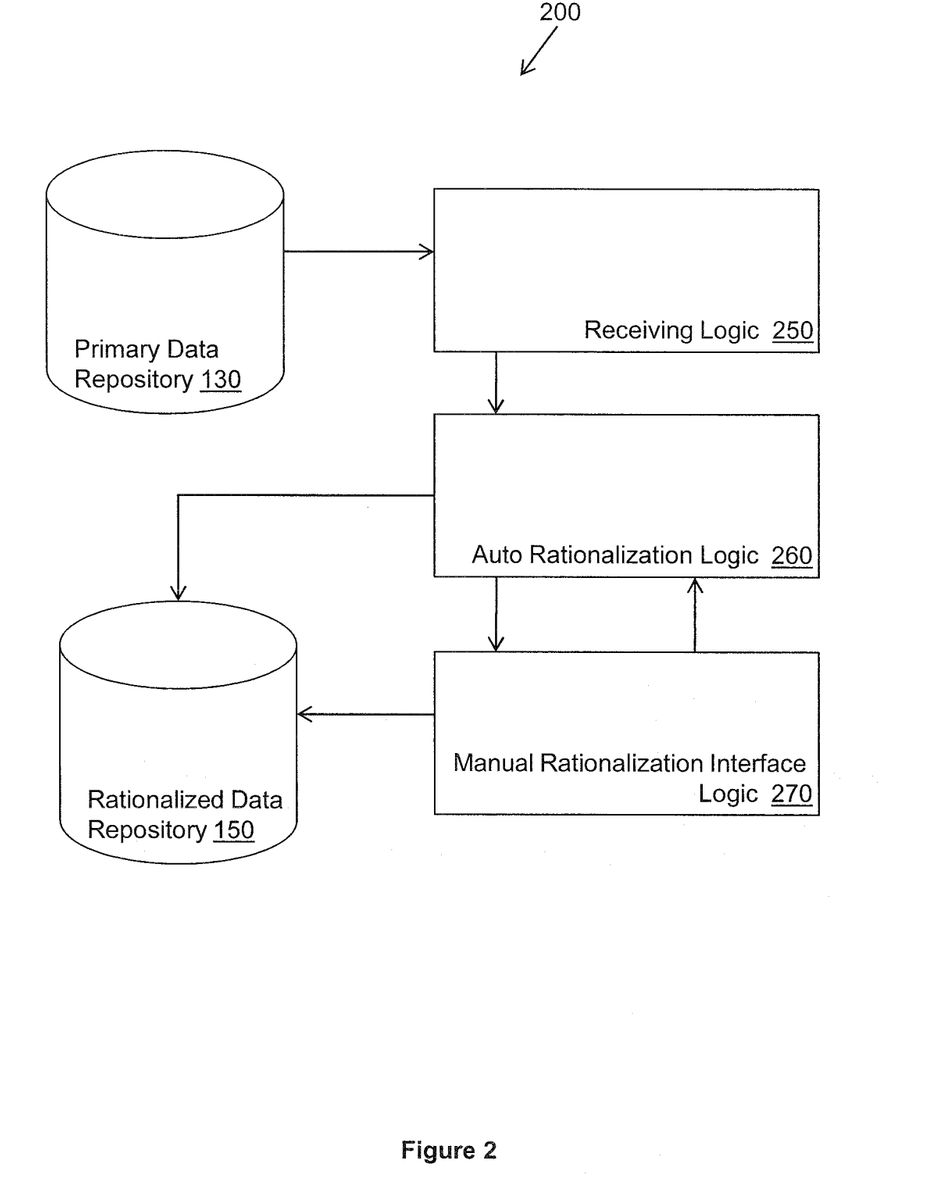
FIG. 2 illustrates an example embodiment of a system associated with data rationalization.

For the purposes of this description, the data rationalization process will be described in the context of rationalizing PV data. It should be appreciated that the data rationalization systems and methods described herein may be employed advantageously in rationalizing any type of data, such as survival outcome data, that is susceptible to an automatic application of rationalization rules and manual rationalization of data instances that are not rationalized during automatic rationalization. Turning now to FIG. 2, an example embodiment of a data rationalization system 200 includes a receiving logic 250, an auto rationalization logic 260, and a manual rationalization interface logic 270. The receiving logic 250 is configured to receive pharmacovigilance (PV) data from a primary data repository. The auto rationalization logic 260 automatically rationalizes the PV data by applying rationalization rules that map one or more non-preferred PV data instances to a preferred PV data instance. One example rationalization rule may map a non-preferred data instance of "Tylenol" or "aspirin free pain reliever" to a preferred data instance of "acetaminophen".

The rationalization rules employed during automatic rationalization include rules and standards that have been defined in previous iterations of data rationalization by health care professionals and translated into automated rules. Thus the rules that are applied during automatic rationalization typically originate with a person having an acceptable level of skill and may be defended as essentially being manually encoded by the person originating the rule. Automatic rules may include correction of common spelling mistakes, identification of synonyms, implementation of terminology updates, coding of entries to MedDRA preferred term (PT) and WHODrug official codes.

The auto rationalization logic 260 is also configured to store the automatically rationalized PV data instances in a rationalized data repository. By storing the rationalized PV data instances in a rationalized data repository 150, the primary data repository is left unmodified so that original data may be recovered by way of a complete audit trail linking the data in the rationalized data repository to the data in the primary data repository.

The manual rationalization interface logic 270 provides any non-preferred PV data instances that remain after automatic rationalization to an interface for manual rationalization. In one example embodiment, the interface is a web interface that can be accessed by qualified health care professionals. The manual rationalization interface logic 270 receives manually rationalized PV data and stores it in the rationalized data repository. The rationalized data repository retains the rationalized data in a normalized format and structure that can be made readily available for publication to client data structures.

During manual rationalization, the health care professionals identify and document any new rules and standards that have been used to rationalize the PV data as well as reasons behind the rationalization. The manual rationalization interface logic extracts these newly developed rationalization rules for use in subsequent automatic rationalization operations and communicates the rules to the auto rationalization logic 250. The development of rules during manual rationalization may include the use of migration keys built into new versions of the MedDRA and WHODrug dictionaries. Using these migration keys may streamline the rationalization process, but their implementation can remain dependent on approval by a healthcare professional.

Figure 3:
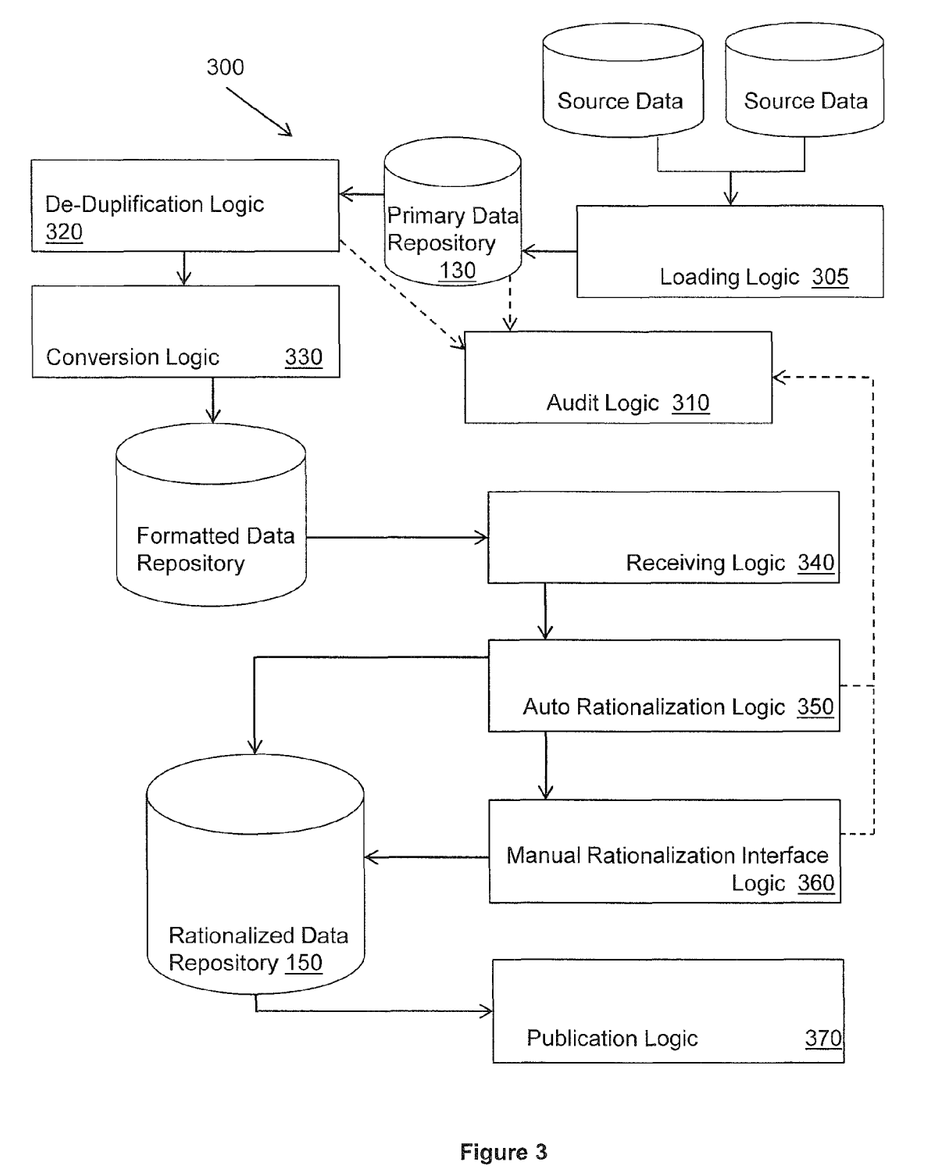
FIG. 3 illustrates another example embodiment of a system associated with data rationalization.

FIG. 3 illustrates another example embodiment of a computing system 300 that performs data rationalization. The system 300 is configured to receive and combine multiple data types and structures from multiple sources. The data sources may include Federal Drug Administration AERS (Adverse Event Reporting System) data and World Health Organization VigiBase data. The data sources may include data in SGML (Standard Generalized Markup Language) format or in an ASCII format, among others. A loading logic 305 restructures the source data according to a predetermined structure that may facilitate format conversion and de-duplification without altering a native format of the source data. The restructured source data is stored in a primary data repository.

A de-duplification logic 320 eliminates redundant instances of data in the primary data source. Redundant data instances include, for example, initial reports and follow up reports about the same adverse event. If a report is sent to the FDA about an incident involving product X on Jan. 10, 2001 and then a follow up report is sent on Jan. 15, 2001 making the incident life threatening, the data from the two reports will be reconciled into a single instance by the de-duplification logic. A logical delete operation is used to ensure that no raw data is lost. Even data that is marked as logically deleted is still available for retrieval if desired. Unique data instances are identified and a most recent copy of each is retained for further processing. The most recent copy may be linked to the deleted data instances so that background information is retained. A conversion logic 330 converts the de-duplicated PV data into a preferred format, such as XML, and migrates the PV data into a formatted data repository. The PV data in the formatted data repository is in a uniform, transportable format.

A receiving logic 340 receives PV data from the formatted data repository for rationalization. An auto rationalization logic 350 automatically rationalizes the PV data by applying rationalization rules that map one or more non-preferred PV data instances to a preferred PV data instance. The auto rationalization logic 350 stores the automatically rationalized PV data instances in a rationalized data repository. A manual rationalization interface logic 360 provides any non-preferred PV data instances that remain after automatic rationalization to an interface for manual rationalization and stores the manually rationalized PV data instances in the rationalized data repository. The manual rationalization interface logic 360 extracts newly developed rationalization rules for use in subsequent automatic rationalization operations and communicates the rules to the auto rationalization logic 350.

A publication logic 370 converts the rationalized PV data stored in the rationalized data repository to a client-selected format and delivers the converted rationalized PV data to a client. For example, the PV data may be provided in a CSV data set or an E2B, or other XML format, data set. Because the PV data is stored in the rationalized data repository in rationalized and normalized form (i.e., XML), conversion to various publication formats is facilitated.

An audit logic 310 records changes made to non-preferred data instances and also records an identifier that identifies a source of the changes. In this manner, the audit logic 310 creates an audit trail linking a rationalized PV data instance to a corresponding "original" or parent PV data instance stored in the primary data repository. The audit logic 310 initiates an audit trail with respect to the primary data repository. Thus the audit trail may be used to trace PV data in the rationalized data repository to its corresponding data instance in the primary data repository. The audit logic records information related to the de-duplification process from the de-duplification logic 320. The logical deletions made by the de-duplification logic 320 are recorded by the audit logic 310 as deletions implemented by the system, and the time the deletion was made is also recorded.

The audit logic 310 also receives information related to changes made to PV data during automatic rationalization from the auto rationalization logic 350. The rule relied on to change a given instance of PV data is recorded and associated with the resulting PV data. In addition, the time of the change as well as an indication that the system was responsible for the change are also recorded. The audit logic 310 receives information related to changes made to PV data during manual rationalization. The manual annotations, additions, flags, or changes that are made during manual rationalization are captured by the audit logic 310 along with the identity of the health care professional that made the change, the time the change was made, and the reason the change was made. The information recorded by the audit logic is provided to the rationalized data repository for tracking purposes. Thus, the audit logic 310 provides an audit trail that links a rationalized PV data instance in the rationalized data repository to its parent PV data instance in the primary data repository.

The audit trail created by the audit logic thus provides a link between the rationalized data set and the source data set. The audit trail also allows the identification of the human decisions made in the rationalization process. The release notes, design documents, and change control documentation provides a traceable link between automated rationalized changes to the human interpretations of the source data. This link maintains the medical integrity of the rationalized data set.

The preservation of the transition from source to rationalized data is important if the data will be used during regulatory reporting. Tracking the attribution and logic behind the data rationalization decisions may be an important factor in achieving acceptance and use of the data by regulatory agencies. Further, the audit trail provides for full fidelity of the decision making process behind the rationalization, i.e., proof of a clean, medically accurate rationalization process. The ability to trace the reasoning and attribute the medical evaluation of the data provides a defensible rationale not provided by state of the art techniques. State of the art techniques may provide accurate results but fail to provide any proof that the results are accurate.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks that are not illustrated.

Figure 4:
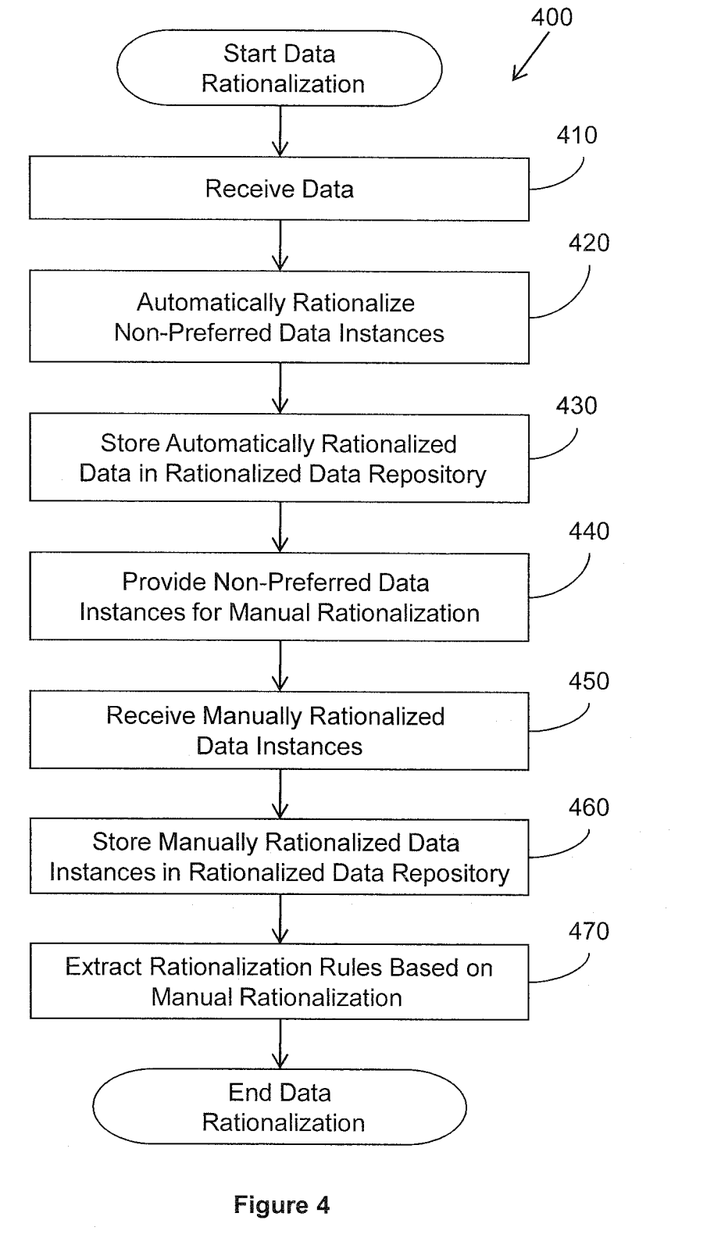
FIG. 4 illustrates an example embodiment of a method associated with data rationalization.

FIG. 4 illustrates an example embodiment of a method 400 that rationalizes data, such as PV data. At 410, the data is received from a primary data repository. At 420 the data is automatically rationalized by applying rationalization rules that map one or more non-preferred data instances to a preferred data instance. At 430 the method includes storing the automatically rationalized data in a rationalized data repository. Any non-preferred data instances that have not been automatically rationalized into a preferred data instance are provided to an interface for manual rationalization at 440. At 450 the manually rationalized data is received and at 460 the data is stored in the rationalized data repository. The method also includes, at 470 extracting rationalization rules based on the manual rationalization for use in subsequent automatic rationalization operations.

In some embodiments, the method also includes maintaining a primary data repository that stores the received data in an original, non-rationalized form. The method may also include eliminating redundant instances of data prior to performing automatic rationalization. In some embodiments, received data includes data stored in the rationalized data repository. In this case, the rationalization rules may include updated rules with respect to the rationalization rules applied to the received data during its prior rationalization. Thus, the method may be used to revise or refresh previously rationalized data according to new rationalization rules.

Figure 5:
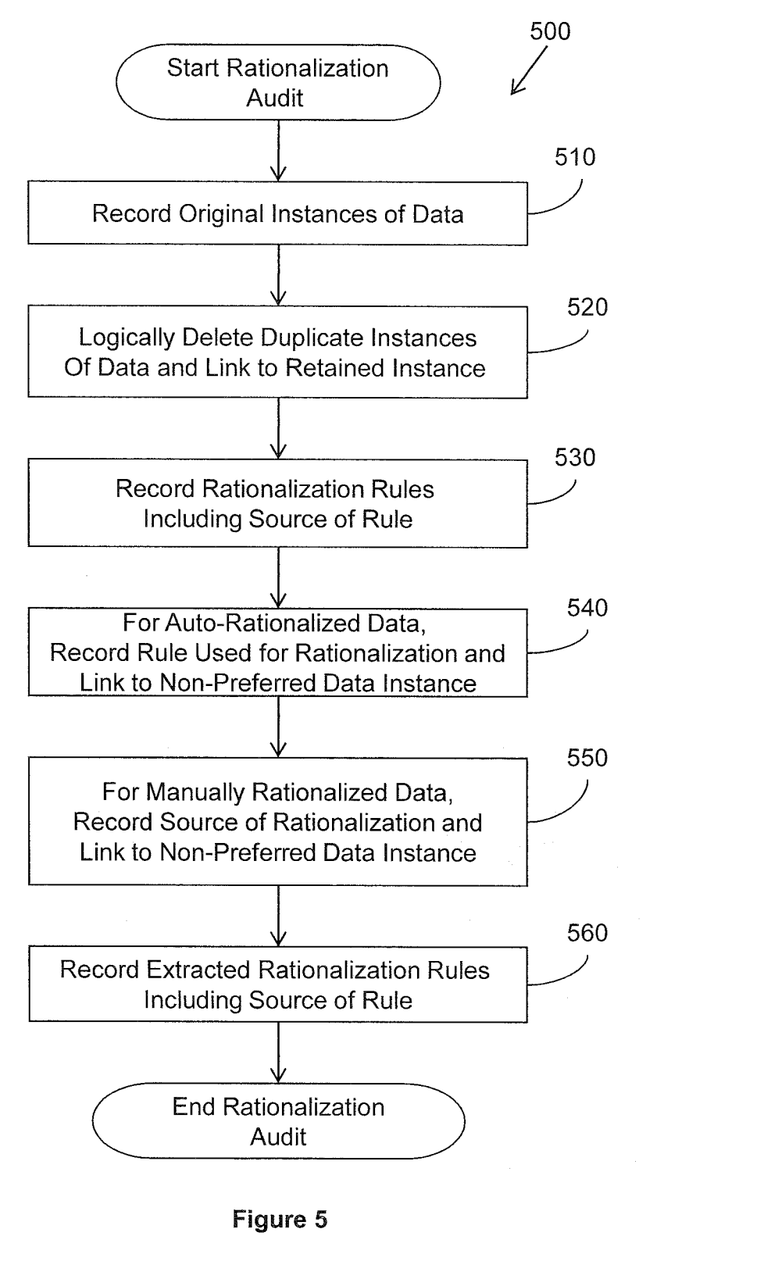
FIG. 5 illustrates another example embodiment of a method associated with data rationalization.

FIG. 5 illustrates an example embodiment of a method 500 that compiles an audit trail associated with the rationalization of data. The method includes, at 510, recording original instances of data. The method also includes, at 520 logically deleting redundant instances of data and linking deleted instances of data to a retained original instance of data. At 530 rationalization rules including a source of the rule are recorded. The method includes, at 540, for respective preferred data instances created during automatic rationalization, linking respective non-preferred data instances and a rule used during auto rationalization with the respective preferred data instances. Likewise, at 550, the method includes, for respective preferred data instances created during manual rationalization, linking respective non-preferred data instances and a source of the manual rationalization with the respective preferred data instances. At 560 rationalization rules extracted during manual rationalization and sources of the extracted rules are recorded.

While FIGS. 4 and 5 illustrate various actions occurring in serial, it is to be appreciated that various actions illustrated in FIGS. 4 and 5 could occur substantially in parallel. By way of illustration, a first process could receive data, a second process could automatically rationalize the data, and a third process could manually rationalize the data. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium is a non-transitory medium that stores computer executable instructions that if executed by a machine (e.g., processor) cause the machine to perform a method that includes receiving data from a primary data repository; automatically rationalizing the data by applying rationalization rules that map one or more non-preferred data instances to a preferred data instance; storing the automatically rationalized data in a rationalized data repository; providing any non-preferred data instances that have not been automatically rationalized into a preferred data instance to an interface for manual rationalization; receiving manually rationalized data and storing the manually rationalized data in the rationalized data repository; and extracting rationalization rules based on the manual rationalization for use in subsequent automatic rationalization operations. While executable instructions associated with the above method are described as being stored on a computer-readable medium, it is to be appreciated that executable instructions associated with other example methods described herein may also be stored on a computer-readable medium.

Figure 6:
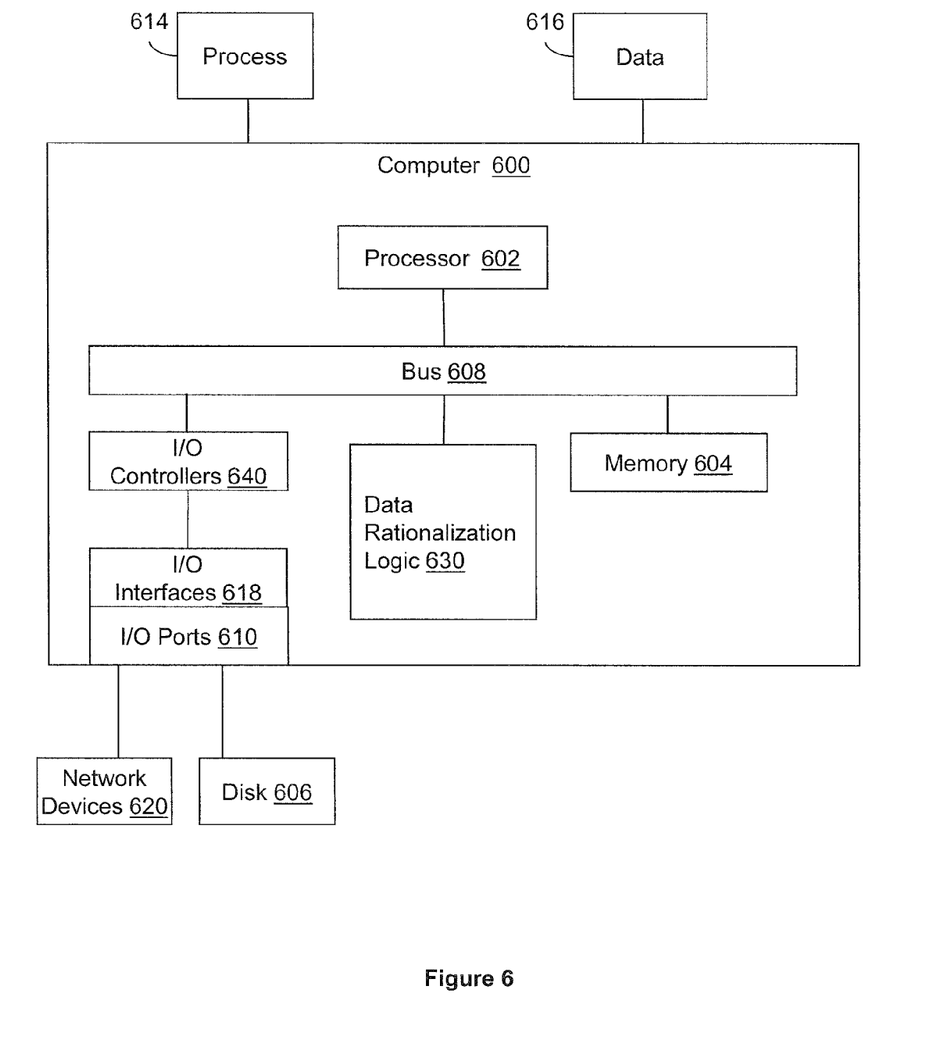
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a data rationalization logic 630 configured to facilitate data rationalization. In different examples, the data rationalization logic 630 may be implemented in hardware, software stored as computer executable instructions on a computer-readable medium, firmware, and/or combinations thereof. While the data rationalization logic 630 is illustrated as a hardware component attached to the bus 608, it is to be appreciated that in one example, the data rationalization logic 630 could be implemented in the processor 602.

Thus, data rationalization logic 630 may provide means (e.g., hardware, instructions stored as computer executable instructions on a computer-readable medium, firmware) for receiving data; and means (e.g., hardware, instructions stored as computer executable instructions on a computer-readable medium, firmware) for automatically rationalizing the data by applying rationalization rules that map one or more non-preferred data instances to a preferred data instance and storing the automatically rationalized data in a rationalized data repository.

The means may be implemented, for example, as an ASIC (application specific integrated circuit) programmed to rationalize data. The means may also be implemented as computer executable instructions that are presented to computer 600 as data 616 that are temporarily stored in memory 604 and then executed by processor 602.

Data rationalization logic 630 may also provide means (e.g., hardware, instructions stored as computer executable instructions on a computer-readable medium, firmware) for providing any non-preferred data instances that have not been automatically rationalized into a preferred data instance to an interface for manual rationalization, receiving manually rationalized data, storing the manually rationalized data in the rationalized data repository, and extracting rationalization rules based on the manual rationalization for use in subsequent automatic rationalization operations.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM (read only memory), PROM (programmable ROM), and so on. Volatile memory may include, for example, RAM (random access memory), SRAM (synchronous RAM), DRAM (dynamic RAM), and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM (compact disk) drive, a CD-R (CD recordable) drive, a CD-RW (CD rewriteable) drive, a DVD (digital versatile disk and/or digital video disk) ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCI (peripheral component interconnect), PCIE (PCI express), 1394, USB (universal serial bus), Ethernet). The bus 608 can be types including, for example, a memory bus, a memory controller, a peripheral bus, an external bus, a crossbar switch, and/or a local bus.

The computer 600 may interact with input/output devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network. Through the network, the computer 600 may be logically connected to remote computers. Networks with which the computer 600 may interact include, but are not limited to, a LAN (local area network), a WAN (wide area network), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method, comprising:
    receiving a first set of data from a primary data repository;
    recording original instances of data from the first set of data;
    logically deleting redundant instances of the original instances of data;
    linking deleted instances of data to a recorded original instance of data;
    recording rationalization rules including a source of the rationalization rules;
    automatically rationalizing the first set of data by applying the rationalization rules that map one or more non-preferred data instances to a preferred data instance, where, during the automatic rationalization, a first non-preferred data instance and a first rule used to rationalize the first non-preferred data instance are linked to the first preferred data instance;
    storing automatically rationalized data in a rationalized data repository;
    providing any non-preferred data instances that have not been automatically rationalized into a preferred data instance to an interface for manual rationalization;
    receiving manually rationalized data that has been manually rationalized and storing the manually rationalized data in the rationalized data repository; and extracting additional rationalization rules based on the manual rationalization for use in subsequent automatic rationalization operations by:
  capturing a preferred data instance that is mapped to a given non-preferred data instance during manual mapping;
  saving the mapping of the captured data instance to the given non-preferred data instance as an additional rationalization rule to be used in automatic rationalization of subsequently received non-preferred data instances corresponding to the given non-preferred data instance;
  recording rationalization rules extracted during manual rationalization and sources of the extracted rules;
  receiving a second set of data from the primary data repository; and
  automatically rationalizing the second set of data by applying the rationalization rules and the additional rules to the second set of data, where, during the manual rationalization, a second non-preferred data instance and a second rule used to rationalize the second non-preferred data instance are linked to a second preferred data instance.

2. The computer-implemented method of claim 1 further comprising maintaining received data in an original, non-rationalized form in the primary data repository.

3. The computer-implemented method of claim 1 further comprising recording changes made to non-preferred data instances and an identifier that identifies a source of the changes to create an audit trail linking a rationalized data instance to a corresponding parent data instance stored in a primary data repository.

4. The computer-implemented method of claim 1 further comprising converting the received data into XML format prior to performing the automatically rationalizing step and further where the rationalized data repository stores the rationalized data in XML format.

5. The computer-implemented method of claim 1, further comprising eliminating redundant instances of data comprises using a logical delete such that deleted data remains available for subsequent retrieval, maintaining a most recent of the redundant instances of data to be rationalized, and creating a link between the most recent of the redundant instances of data and deleted redundant instances of data.

6. The computer-implemented method of claim 1 where providing any non-preferred data instances to an interface for manual rationalization comprises providing the non-preferred data instances to a web based interface for manual rationalization.

7. The computer-implemented method of claim 1 comprising applying revised rationalization rules to rationalized data in the rationalized data repository and storing the resulting rationalized data in the rationalized data repository.

8. The computer-implemented method of claim 1 further comprising converting the automatically rationalized data and the manually rationalized data stored in the rationalized data repository to a different format and delivering converted rationalized data to a client.

9. A computing system, comprising:
  a processor;
  a receiving logic configured to cause the processor to at least receive a first set of pharmacovigilance (PV) data and a second set of PV data from a primary data repository;
  an auto rationalization logic configured to cause the processor to at least automatically rationalize the first set and the second set of PV data by applying rationalization rules that map one or more non-preferred PV data instances to a preferred PV data instance and store automatically rationalized first set and the second set of PV data instances in a rationalized data repository, where the auto rationalization logic is further configured to link a first non-preferred PV data instance and a first rule used to rationalize the first non-preferred PV data instance to a first preferred PV data instance;
  a manual rationalization interface logic configured to cause the processor to at least provide any non-preferred PV data instances to an interface for manual rationalization, receive manually rationalized the first set of PV data, and extract additional rationalization rules based on manual rationalization for use in subsequent automatic rationalization operations of the second set of PV data by:
    capturing a preferred data instance that is mapped to a given non-preferred data instance during manual mapping;
    saving the mapping of the captured data instance to the given non-preferred data instance as an additional rationalization rule to be used in automatic rationalization of subsequently received non-preferred data instances corresponding to the given non-preferred data instance; and
    where the manual rationalization interface logic is further configured to link a second non-preferred PV data instance and a second rule used to rationalize the second non-preferred PV data instance to a second preferred PV data instance; and
  a de-duplication logic configured to cause the processor to eliminate redundant instances of data prior to performing automatic rationalization.

10. The computing system of claim 9 further comprising a loading logic configured to cause the processor to least restructures source data according to a predetermined structure without altering a native format of the source data and stores restructured source data in a primary data repository.

11. The computing system of claim 9 further comprising a conversion logic configured to cause the processor to at least convert the received data into an XML format prior to performing automatic rationalization and further where the rationalized data repository stores rationalized data in the XML format.

12. The computing system of claim 9 where the manual rationalization interface logic is configured to cause the processor to provide the non-preferred PV data instances to a web based interface for manual rationalization.

13. The computing system of claim 9 further comprising a publication logic configured to cause the processor to at least convert rationalized data stored in the rationalized data repository to a different format and delivering converted rationalized data to a client.

14. The computing system of claim 9 further comprising an audit logic configured to cause the processor to record changes made to non-preferred data instances and an identifier that identifies a source of the changes to create an audit trail linking a rationalized data instance to a corresponding parent data instance stored in a primary data repository.

15. The computing system of claim 9 where:
  the receiving logic comprises means for receiving data;
  the auto rationalization logic comprises means for at least automatically rationalizing the data by applying rationalization rules that map one or more non-preferred data instances to a preferred data instance and storing the automatically rationalized data in a rationalized data repository; and the manual rationalization interface logic comprises means for at least providing any non-preferred data instances that have not been automatically rationalized into a preferred data instance to an interface for manual rationalization, receiving manually rationalized data, storing the manually rationalized data in the rationalized data repository, and extracting rationalization rules based on the manual rationalization for use in subsequent automatic rationalization operations.

16. A non-transitory computer-readable medium storing computer-executable instructions that when executed by a computer cause the computer to perform a method, the method comprising:

receiving a first set of data from a primary data repository;

automatically rationalizing the first set of data by applying rationalization rules that map one or more non-preferred data instances to a preferred data instance, where, during the automatic rationalization, a first non-preferred data instance and a first rule used to rationalize the first non-preferred data instance are linked to the first preferred data instance;

storing automatically rationalized data in a rationalized data repository;

providing any non-preferred data instances that have not been automatically rationalized into a preferred data instance to an interface for manual rationalization;

receiving manually rationalized data and storing the manually rationalized data in the rationalized data repository; and extracting rationalization rules based on the manual rationalization for use in subsequent automatic rationalization operations by:

capturing a preferred data instance that is mapped to a given non-preferred data instance during manual mapping;

saving the mapping of the captured data instance to the given non-preferred data instance as an additional rationalization rule to be used in automatic rationalization of subsequently received non-preferred data instances corresponding to the given non-preferred data instance;

receiving a second set of data from the primary data repository;

automatically rationalizing the second set of data by applying the rationalization rules and the additional rules to the second set of data, where, during the manual rationalization, a second non-preferred data instance and a second rule used to rationalize the second non-preferred data instance are linked to a second preferred data instance; and eliminating redundant instances of data by at least using a logical delete such that deleted data remains available for subsequent retrieval, maintaining a most recent of the redundant instances of data to be rationalized, and creating a link between the most recent of the redundant instances of data and deleted redundant instances of data.

17. The computer-readable medium of claim 16 where the method comprises converting the received data into an XML format prior to performing automatic rationalization and further where the rationalized data repository stores the automatically rationalized data and the manually rationalized data in the XML format.

\* \* \* \* \*